United States Patent [19]

Kamo et al.

[11] Patent Number: 5,572,699

[45] Date of Patent: Nov. 5, 1996

[54] VARIABLE LENGTH DATA IN A PARALLEL DISK ARRAY

[75] Inventors: Yoshihisa Kamo, Musashimurayama; Hajime Aoi, Tachikawa; Hitoshi Kakuta, Kokubunji; Yoshito Tsunoda, Tokyo; Hiromichi Fujisawa, Tokorozawa; Yosuke Seo, Sagamihara; Yasuhide Ouchi, Koganei, all of Japan

[73] Assignee: Hitachi, Ltd., Tokyo, Japan

[21] Appl. No.: 32,191

[22] Filed: Mar. 15, 1993

Related U.S. Application Data

[63] Continuation of Ser. No. 406,581, Sep. 13, 1989, abandoned.

[30] Foreign Application Priority Data

Sep. 19, 1988 [JP] Japan ................................ 63-232357
Sep. 28, 1988 [JP] Japan ................................ 63-241104

[51] Int. Cl.[6] ........................... G06F 12/04; G06F 17/30
[52] U.S. Cl. ...................... 395/441; 345/886; 345/616; 364/DIG. 1; 364/245.1
[58] Field of Search ................... 364/DIG. 1, DIG. 2; 395/500, 425, 725, 775, 441, 886, 600

[56] References Cited

U.S. PATENT DOCUMENTS

| | | | |
|---|---|---|---|
| 3,648,255 | 3/1972 | Beausoleil et al. | 395/425 |
| 4,148,098 | 4/1979 | McCreight et al. | 364/200 |
| 4,430,712 | 2/1984 | Coulson et al. | 395/600 |
| 4,476,527 | 10/1984 | Clayton, IV | 364/200 |
| 4,509,113 | 4/1985 | Heath | 395/500 |
| 4,509,118 | 4/1985 | Shenk | 364/200 |
| 4,523,276 | 6/1985 | Maejima et al. | 395/425 |
| 4,731,737 | 3/1988 | Witt et al. | 364/200 |
| 4,805,090 | 2/1989 | Coogan | 395/500 |
| 4,829,421 | 5/1989 | Ritchie | 364/200 |
| 4,849,929 | 7/1989 | Timsit | 364/900 |
| 4,870,643 | 9/1989 | Bultman et al. | 360/98.01 |
| 4,942,579 | 7/1990 | Goodlander et al. | 364/200 |
| 4,956,810 | 9/1990 | Sherman et al. | 364/900 |
| 4,958,315 | 9/1990 | Balch | 395/500 |
| 4,989,205 | 1/1991 | Dunphy, Jr. et al. | 364/200 |
| 4,992,931 | 2/1991 | Hirasawa | 395/500 |
| 4,993,030 | 2/1991 | Krakauer et al. | 395/600 |
| 5,023,829 | 6/1991 | Shibata | 395/775 |

OTHER PUBLICATIONS

Mini–Micro Systems, Dec. 1987 pp. 15–16.
IBM Product Announcement, Sep. 1, 1987 pp. 1–3.
Abstract of JP–A–61–187060, Aug. 20, 1986.
Abstract of JP–A–54–36911 Mar. 27, 1979.

*Primary Examiner*—Thomas G. Black
*Assistant Examiner*—John C. Loomis
*Attorney, Agent, or Firm*—Antonelli, Terry, Stout & Kraus

[57] ABSTRACT

A file system including an input/output unit for inputting data from and outputting data to an external system; a controller connected to the input/output unit for dividing the data into an optional number of parallel data; a management table for storing the number of divisions of the data; a head group for writing the divided parallel data into a storage medium at the same time; and a unit for reading the data from the storage medium while referring to information stored in management device.

30 Claims, 11 Drawing Sheets

FIG. 7

| NO. | LOGIC VOLUME | DATA SET | CAPACITY (NO. OF TRUCKS) | NO. OF DIVISIONS | DISK NUMBER | DATA START TRUCK/CYLINDER NUMBER |
|---|---|---|---|---|---|---|
| 1 | DA 100 | AN 100 | 60 | 3 | A00 | 5/100 |
|  |  |  |  |  | B00 | 5/100 |
|  |  |  |  |  | C00 | 5/100 |
|  |  | AN 101 | 120 | 3 | A00 | 3/300 |
|  |  |  |  |  | B00 | 3/300 |
|  |  |  |  |  | C00 | 3/300 |
|  |  | ...... | ...... | ...... | ...... | ...... |
| 2 | DA 101 | BN 100 | 30 | 1 | A01 | 1/50 |
|  |  | BN 103 | 100 | 1 | A01 | 1/200 |
|  | ...... | ...... | ...... | ...... | ...... | ...... |

FIG. 9

| NO | LOGICAL VOLUME | DATA SET | CAPACITY (NO. OF TRUCKS) | NO. OF DIVISIONS | DISK NUMBER | DATA START TRUCK/CYLINDER NUMBER |
|---|---|---|---|---|---|---|
| 1 | DA 100 | KE 000 | 400 | 1 | 801 | 000/0005 |
|   |        | HB 000 | 8000 | 1 | 801 | 000/0050 |
| 2 | DA 101 | KE 001 | 400 | 1 | 802 | 000/0005 |
|   |        | HB 001 | 8000 | 1 | 802 | 000/0050 |
| 3 | DA 102 | KE 002 | 400 | 1 | 803 | 000/0005 |
|   |        | HB 002 | 8000 | 1 | 803 | 000/0050 |
| 4 | DA 103 | KE 003 | 400 | 1 | 804 | 000/0005 |
|   |        | HB 003 | 8000 | 1 | 804 | 000/0050 |
| 5 | DA 104 | KE 004 | 400 | 1 | 805 | 000/0005 |
|   |        | HB 004 | 8000 | 1 | 805 | 000/0050 |
| 6 | DF 100 | FI 000 | 20000 | 5 | 806 | 000/0005 |
|   |        | FI 001 | 20000 | 5 | 807 | 000/0005 |
|   |        | FI 002 | 20000 | 5 | 808 | 000/0005 |
|   |        | FI 003 | 20000 | 5 | 809 | 000/0005 |
|   |        | FI 004 | 20000 | 5 | 810 | 000/0005 |
| 7 | DF 101 | FI 005 | 20000 | 5 | 811 | 000/0005 |
|   |        | FI 006 | 20000 | 5 | 812 | 000/0005 |
|   |        | FI 007 | 20000 | 5 | 813 | 000/0005 |
|   |        | FI 008 | 20000 | 5 | 814 | 000/0005 |
|   |        | FI 009 | 20000 | 5 | 815 | 000/0005 |

KE 000 ~ KE 004 ; KEYWORD, BIBLIOGRAPHIC ITEM DATA SET
HB 000 ~ HB 004 ; TEXT DATA SET
FI 000 ~ FI 009 ; DRAWING/PHOTO DATA SET

VARIABLE LENGTH DATA IN A PARALLEL DISK ARRAY

This application is a continuation application of Ser. No. 07/406,581, filed Sep. 13, 1989, now abandoned.

BACKGROUND OF THE INVENTION

The present invention relates to a file system used for computer systems, data bank systems or the like, and more particularly to a disk file system suitable for use with a plurality of disk drives.

A conventional file system having a plurality of magnetic disk drives from or into which data divided in units of a bit or byte are parallel read or written at the same time, is disclosed, for example, in Mini-Micro Systems, Dec. 1987, pp. 15 to 16. This system is constructed as shown in FIG. 2. Specifically, in writing information, data as well as a write command sent from a computer main frame (CPU, not shown) are supplied via an input/output controller 21 to a sequencer 22 whereat the serial input data are divided in units of a bit or byte and converted into parallel data. The parallel data are supplied via controllers provided for respective disk drives 31 to 35 to buffers 41 to 45. The above operations are controlled by a microprocessor 23. When the disk heads (not shown) reach the particular record areas, the parallel data are written in the areas at the same time. In most cases, the disk drives 31 to 35 are controlled to have synchronized revolution. The information read from each disk drive is temporarily stored in the buffer. The sequencer synchronously converts the parallel data from the disk drives into serial data which are sent via the input/output controller to the computer main frame.

There is disclosed in Japanese Patent Laid-Open Publication JP-A-54-39611 a technique wherein divided parallel data are written into or read from a plurality of stacked magnetic disks by using plural pairs of heads provided for both sides of each disk.

According to a technique described in Japanese Patent Laid-open Publication JP-A-61-187060, a plurality of processing devices and disk drives are coupled to a common bus and a common cache memory for reading/writing data. Use of a nonvolatile memory in a disk controller is described in IBM Product Announcement/IBM 3990 Storage Control.

The above conventional techniques all allow a high data transfer rate by dividing data stored in a single storage into plural data which are then written at the same time in plural disks, or vice versa.

According to the above-described conventional techniques, however, there is a problem that the system is fixed so that it cannot meet various user requirements. If, after such a fixed system is once introduced, a system of higher performance is required, it is necessary to replace the whole or part of the fixed system. A user file may sometimes be used both as a random accessing on-line file in the day and as a sequential batch processing file in the night. Such a performance changing with time cannot be met at all with the conventional techniques.

The conventional techniques are further associated with a problem that the transfer rate in reading/writing a great number of data is dependent upon the performance of an external storage (disk or the like). It is possible to support the operation or reading/writing a great number of data from/into a plurality of storages, with the aid of software. In this case, however, processing devices are dedicated to the software procedure so that the overhead is increased, resulting in a problem of lowering the computer system performance, a problem associated with development of control programs, and the like problem.

Further, for example, the system according to the conventional techniques may have an insufficient capability in processing concentrated read/write requests to particular data in an external storage during an on-line data processing. This is because there occurs a process time limit including an access time, latency time, and the like during disk mechanical operations.

Furthermore, a conventional parallel data transfer type disk file has the following problems depending upon the data length of the user file.

Specifically, an ordinary magnetic disk drive uses the data format as shown in FIG. 3. The truck is composed of an index marker 60 indicating the start of the truck, a home address area 70 for storing the cylinder number and head number for the truck, a record 0 area (Ro area) 80 for storing a location of a substitute truck and the like, and record (2 to n) areas 90. The records are partitioned by an area 100 called a gap. The gap is used for discriminating between records, synchronizing with the read analog circuit, and sending/receiving a command for the channel. Each record includes, as shown in FIG. 3, a count area 110 for identifying the record, a key area 120 (some record has not this area), and a data area 130 for storing user data, a gap 140 being interposed for discriminating between the areas 110, 120 and 130. The gap 100 between records is usually 61 bytes, whereas the gap 140 within the record is 51 bytes. Therefore, the gap areas of 112 or 163 bytes are required for storing one record.

According to the above-described conventional techniques, the number of divisions of data is always fixed so that the following problems occur. Namely, (1) if short length data are divided into a number of data, the data length (record length) becomes considerably short and the ratio of gap areas to one record area increases, thus lowering the efficiency. (2) Since the transfer rate is fixed, long length data requires a long data processing time.

SUMMARY OF THE INVENTION

It is an object of the present invention to provide a file system capable of flexibly dealing with various user requirements.

It is another object of the present invention to provide a file system capable of efficiently writing and reading data irrespective of the length of data or a different transfer rate requested by a user.

It is a further object of the present invention to provide a file system having a sufficient capability of dealing with concentrated read/write requests to particular data in an external storage.

In order to achieve the above objects, the file system of this invention is constructed of input/output means for inputting data from and outputting data to an external system; control means connected to said input/output means for dividing said data into an optional number of parallel data; management means for storing the number of divisions of said data; heads for writing said divided parallel data into a storage medium at the same time; and means for reading said data from said storage medium while referring to the information stored in said management means.

The number of divisions of data is set in accordance with the length of data to be dealt with, and the transfer rate necessary for the system. The management means stores the number of data divisions into parallel data. The divided parallel data are sent to respective heads to be written in the storage medium. The parallel data are read from the medium while referring to the information regarding the write state of the data concerned, such as the number of data divisions stored in the management means.

In allocating a data record area (called a data set) in the disk file system, the number of data divisions is determined so as to allow simultaneous data read/write, in accordance with a user requirement or a data characteristic. Then, registered in the management table provided at a controller or at a dedicater nonvolatile memory are: a data set name, logical volume name, number of divisions, actual volume name on disk drive, cylinder number, and head number.

The number of data divisions may be determined by a user, or may be automatically determined by a controller, to thereby allocate a data set in a disk.

When a data set is deleted, not only the data set on a disk but also management information on the data set stored in a management table is deleted.

In writing data, the number of data divisions into record areas is read from the management table so that the data are divided into parallel data and written in the record areas while accessing all the designated disk drives.

In reading data, the number of data divisions and a group of disk drives are identified while referring to the management table at the number of a data set in which the data to be read are stored. The identified disk drives are accessed to read the parallel data which are then converted into serial data and sent to a computer main frame. In this case, it is preferable that the disk drives are revolved synchronously with each other.

By determining the number of divisions and allocating a data set in a disk in the above manner, it is possible to realize a file system capable of flexibly dealing with user applications each having a different capacity, transfer rate, data length or the like, depending upon user requirements or data characteristics.

In order to improve the speed of processing particular data on a particular disk drive, a nonvolatile memory may be provided in a controller or disk drive so that a read/write of information with respect to a particular truck is performed by using the nonvolatile memory while allocating the particular truck on an acutal disk to the nonvolatile memory.

A part of the nonvolatile memory in the controller, or the nonvolatile memory in the disk drive emulates a plurality of trucks on a disk. Therefore, a read/write of data on a designated truck on a designated disk can be performed by using the nonvolatile memory, thereby unnecessitating an access time and latency time of the head and allowing a high speed operation.

BRIEF DESCRIPTION OF THE DRAWINGS

FIG. 7 shows an example of the management table used in this invention;

FIG. 9 conceptually illustrates an embodiment of the disk management table according to the present invention;

DESCRIPTION OF THE PREFERRED EMBODIMENTS

1st Embodiment

Figure 1:
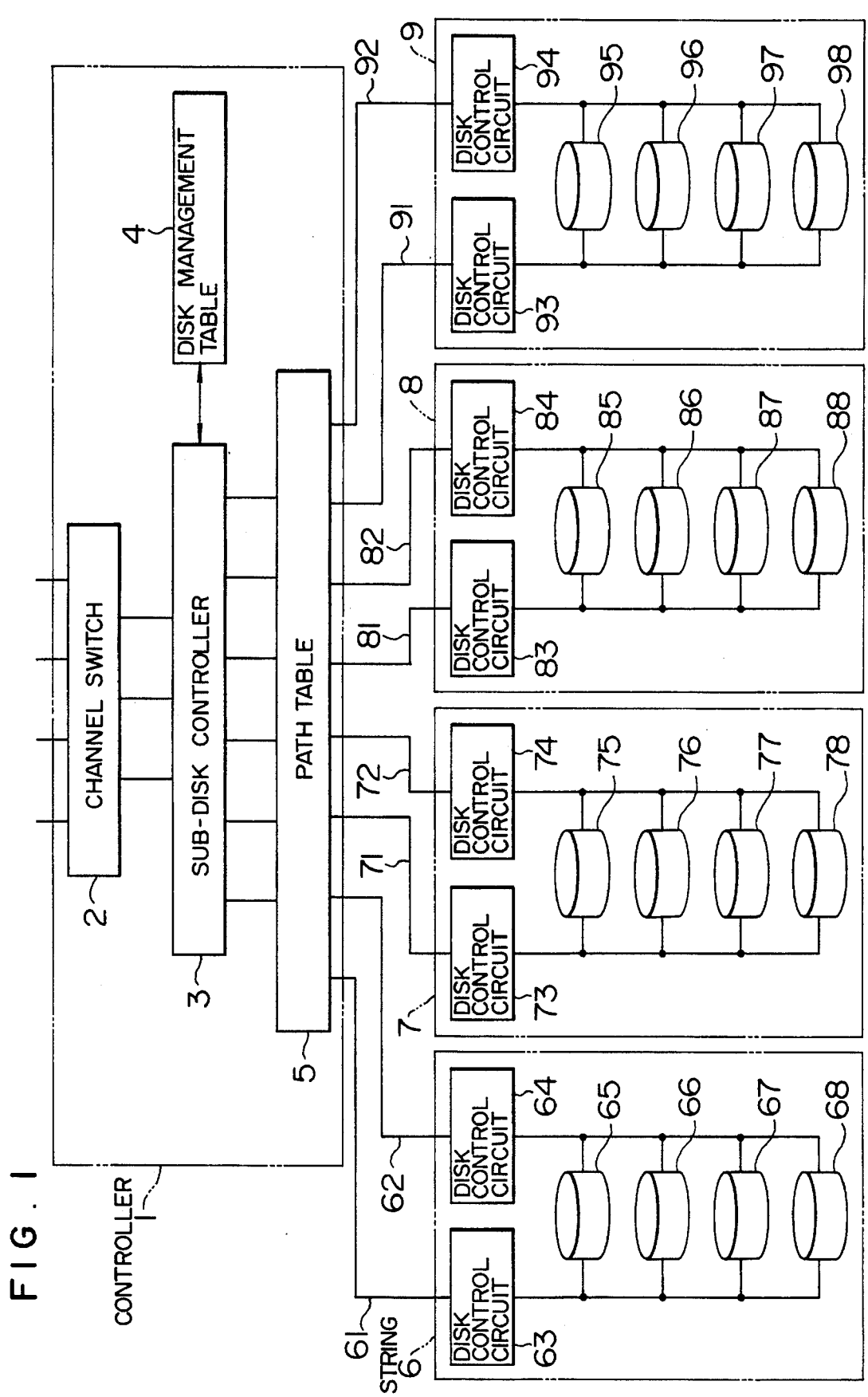
FIG. 1 is a block diagram showing an embodiment of the file system according to the present invention.
Figure 2:
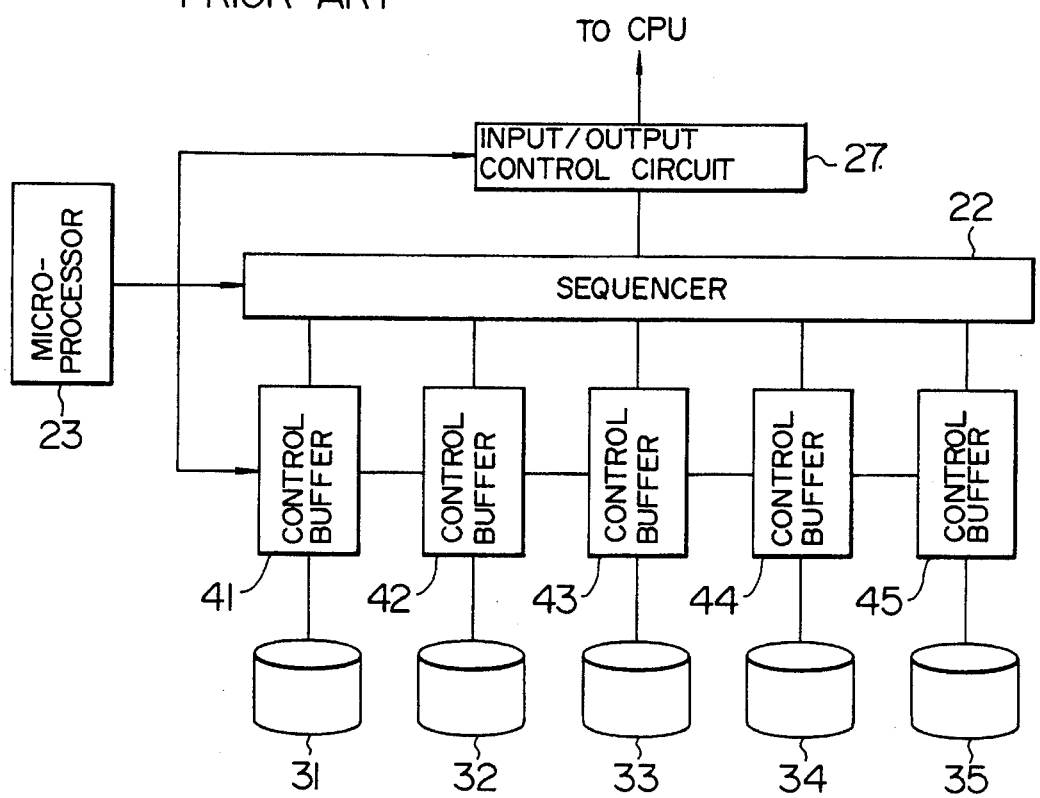
FIG. 2 is a block diagram showing a conventional file system.
Figure 3:
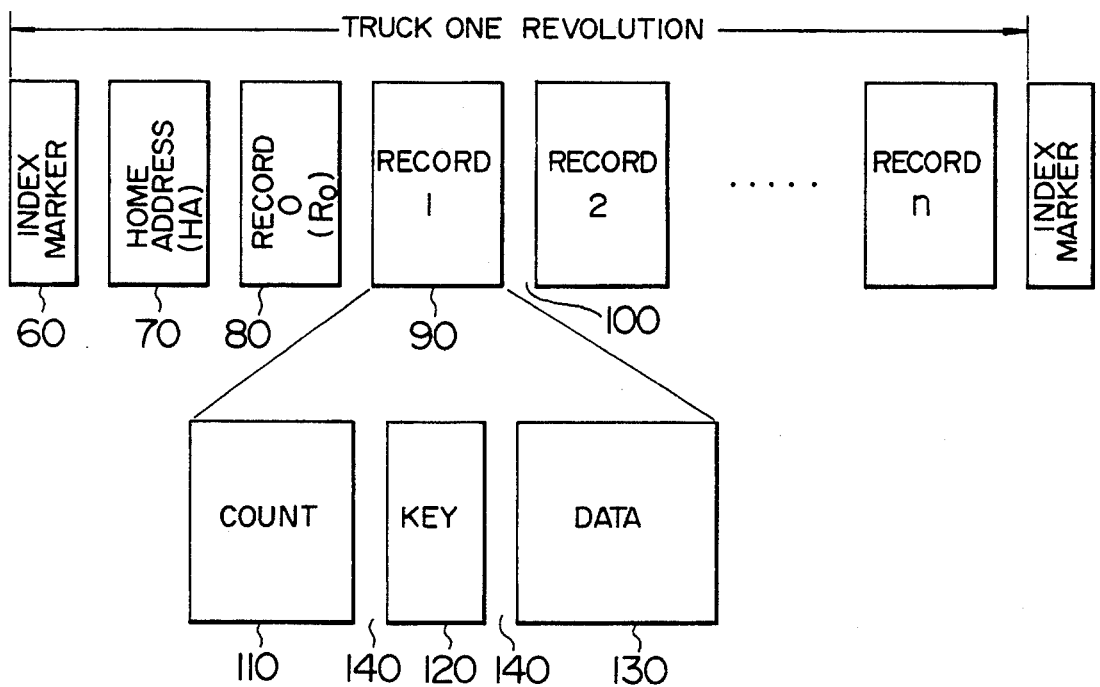
FIG. 3 conceptually illustrates the conventional data format of a disk truck.

A first embodiment of this invention will be described with reference to FIG. 1 showing the system outline. In this embodiment, the number of divisions of data to be stored is made larger as the data become longer, to thereby realize a high data transfer rate. In this system, divided data are stored at different disk drives.

In allocating a data set, an allocation command sent via a channel (not shown) from a computer main frame (not shown) is supplied via a channel switch 2 to a sub-disk controller 3 whereat the allocation command is decoded.

Figure 4:
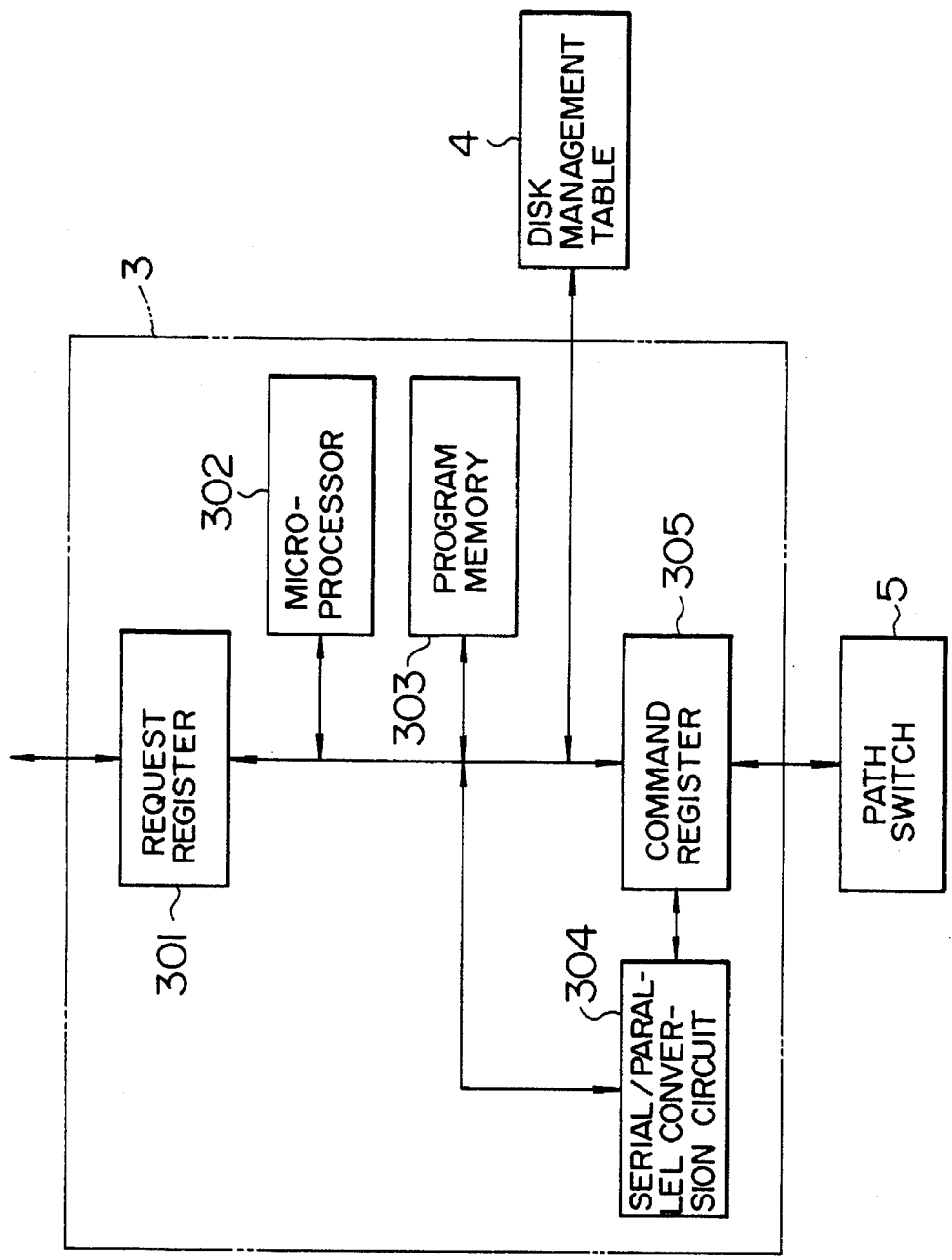
FIG. 4 is a block diagram showing an example of a sub-disk controller.

FIG. 4 shows an example of the sub-disk controller 3. In the sub-disk controller 3, the command stored in a request register 301 is decoded by a microprocessor 302 in accordance with the procedure stored in a program memory 303, and the number of divisions of data to be stored in a particular data set is determined in accordance with the data length. In this embodiment, the maximum number of divisions is set at 4. The data whose length is equal to or smaller than 4 KB are not divided, the data from 4 KB to 8 KB are divided by 2, the data from 8 KB to 12 KB are divided by 3, and the data equal to or longer than 12 KB are divided by 4. The disk drives as many as the number of divisions are allocated, one disk drive per each disk group 6 to 9 connected to the same path via which data or commands are transferred. Each disk group is called a string and composed of disk drives 65 to 68, 75 to 78, 85 to 88, or 95 to 98. The capacity assigned to one disk drive is (capacity required for a data set)/(number of divisions). For example, in this embodiment, assuming that the length of data is 10 KB and the capacity required for a data set is 12 MB, then the data are divided by 3, and 4 MB data are assigned to each disk drive 65, 76, 85 shown in FIG. 1.

The allocation results including a data set name, logical volume name, capacity, division number, actual disk volume name and the like are stored in a management table 4.

An example of the management table is shown in FIG. 7. In this example, the strings 6, 7, 8 and 9 shown in FIG. 1 are given reference characters A, B, C and D, respectively. The disk drives 65, 75, 85 and 95 are given reference numeral 00, the disk drives 66, 76, 86 and 96 are given reference numeral 01, and the remaining disks are given reference numerals 02, and 03 in the similar manner. Therefore, the disk drive 65 is given reference number A00, disk drive 76 is given reference number B01, and so on. In the management table shown in FIG. 7, the logical volume DA100 includes three disk drives A00, B00 and C00, the data for each data set being divided by 3 and stored in a corresponding disk. The data sets belonging to the logical volume DA100 are AN100, AN101 and so on. The data start truck/cylinder numbers are also stored for each data set. For the purpose of management simplicity, although the disk drives are different, the same truck/cylinder numbers are given for the data start positions. However, different truck/cylinder numbers may also be given to different disk drivers.

The logical volume DA101 includes a single disk drive. In this example, the logical volume DA101 includes a disk drive A01 different from the disk drives used for the logical volume DA100. However, if the disk drive A00, B00, C00 or the like has a vacant space, the data for the data set BN100 may be stored in the vacant space. In this case, data sets for different data division numbers are stored at the same disk drive.

The management table indicates the use status of the file system. It is necessary that the table contents be retained even after the power is turned off. Thus, it is necessary to provide a semiconductor memory nonvolatilized with battery or a dedicated nonvolatile memory (e.g. another disk drive). In order to further improve the reliability, it is desirable to prepare a duplicated management table. In this embodiment, although the management table is provided at the controller, it may be provided at another position, e.g., by using a part of the disk drive.

In writing data, a write command and the data sent via the channel switch 2 are decoded at the sub-disk controller shown in FIG. 4. Specifically, the microprocessor 302 decodes the contents of the request register 301 in accordance with the procedure stored in the program memory 303. In this case, the data set to which the data to be written belong, the number of divisions, disk drive number and the like are read from the management table. The data to be written are converted into parallel data at a serial/parallel conversion circuit 304 in accordance with the number of divisions. The parallel data are stored in a command register together with a command or commands for activating one or a plurality of disk drives via the path switch 5. The path switch 5 is used for selecting idle path or paths from those paths 61, 62, 71, 72, 81, 82, 91, and 92 provided for respective strings (two paths per string in FIG. 1), in accordance with the data division number. The write commands and the data to be written are sent to the strings. The data are then stored at the actual disk drives 65 to 68 designated by the disk control circuits 63, 64, . . . , 93, 94.

Figure 5:
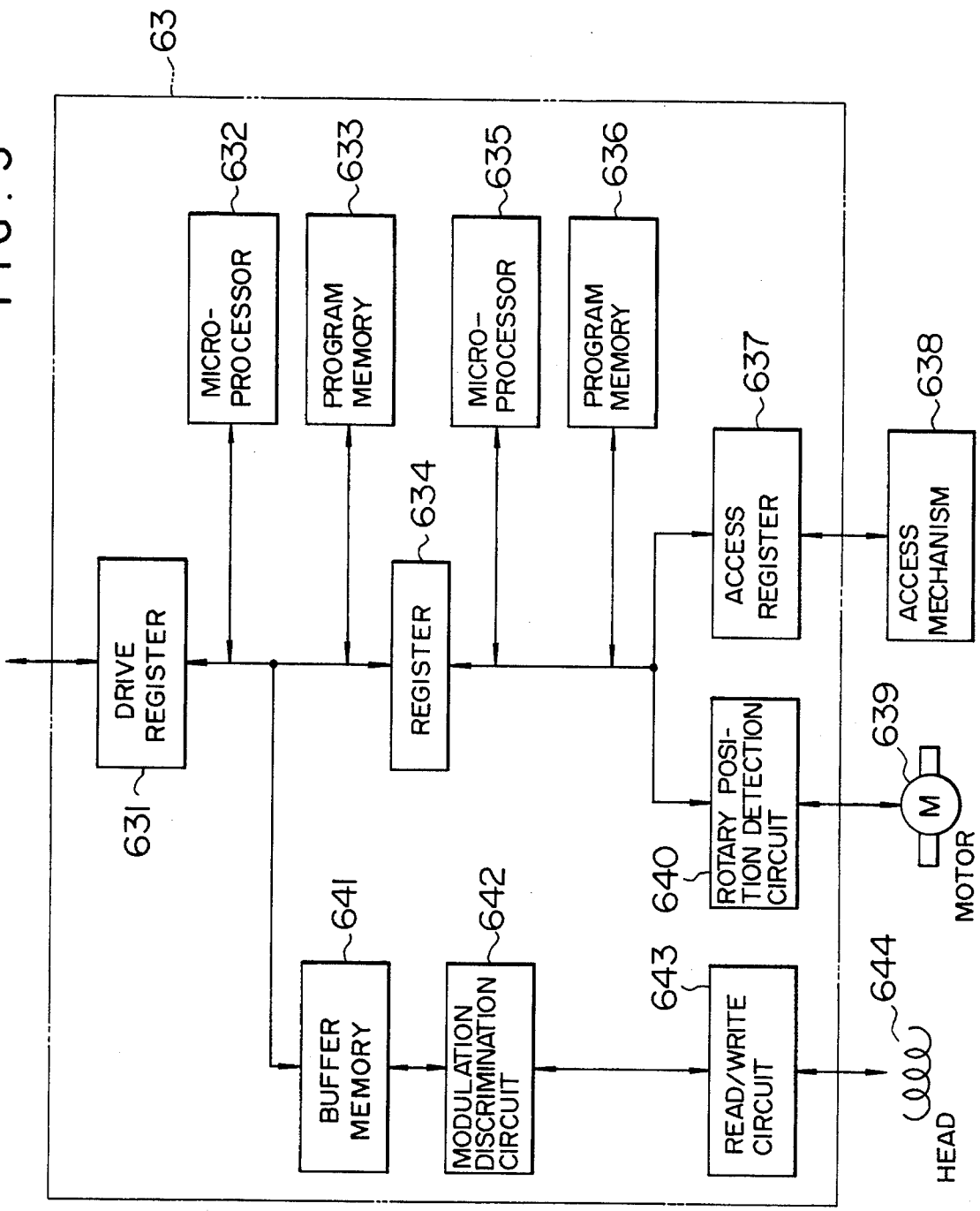
FIG. 5 is a block diagram showing an example of the disc control circuit.

FIG. 5 shows an example of the disk control circuit. The write command and the parallel divided data sent to each string and stored in a drive register 631 are decoded and executed by a microprocessor 632 in accordance with the procedure stored in a program memory 633. Of the write command, an instruction for head access, rotary position detection and the like is loaded in a register 634. The instruction is executed with the aid of a microprocessor 635 and program memory 636 so that a head access truck number is set at an access register 637 and an access mechanism 638 is driven. The microprocessor 635 also monitors a rotary position detection circuit 640 for a disk drive motor 639 in order to send a data write timing to the microprocessor 632. The data are stored in a buffer memory 641, and when the head 644 reaches a record area, the data are recorded therein by making a recording current to flow through the head 644 with the aid of a modulation discriminator circuit 642 and read/write circuit 643.

In reading data, the number of divisions of data in data sets (e.g., division 2), disk number (e.g., disk drivers 68 and 95), and so on are read from the management table 4. All the associated disk drives (e.g., disk drives 68 and 95) are accessed to read the data. The parallel read data are converted into serial data at the sub-drive controller 3 and sent to the computer main frame. It is preferable to conduct synchronized revolution between disk drives (at least between sub-disk drives) in order to smoothly perform the data read/write operation.

In this embodiment, a single disk drive per string is selected as a sub-disk drive. If there are provided plural paths for a string, the sub-disk drives as many as the number of paths may be used within a single string for the data read/write. In the above embodiment, two disk drives (e.g., 65 and 66) may be used as sub-disk drives within the same string.

Further, the embodiment has been described on the assumption of the maximum division number of 4, four sub-disk drives per string, and two paths per string. There is no constraint as to the string number $n_s$, disk drive number per string $n_D$, and path number per string $n_p$. The maximum data division number N is given by:

$$N=n_s \times n_p (n_p \leq n_D),$$

or $$N=n_s \times n_D (n_p > n_D)$$

on the assumption that a plurality of sub-disk drives are used within the same string.

In the above embodiment, a single head access mechanism is provided for each path. If each disk drive is provided with its own head access mechanism, then the disk drives at this path may be allocated to a data set independently from each other.

Further in the above embodiment, the number of divisions is made larger as the length of data becomes longer. The number of divisions may be changed with a data transfer rate a user requests. In this case, if the number of data divisions is n, the overall transfer rate of data to be written or read with n heads at the same time becomes $D_R \times n$ where $D_R$ is a data transfer speed by each head.

2nd Embodiment

Figure 6:
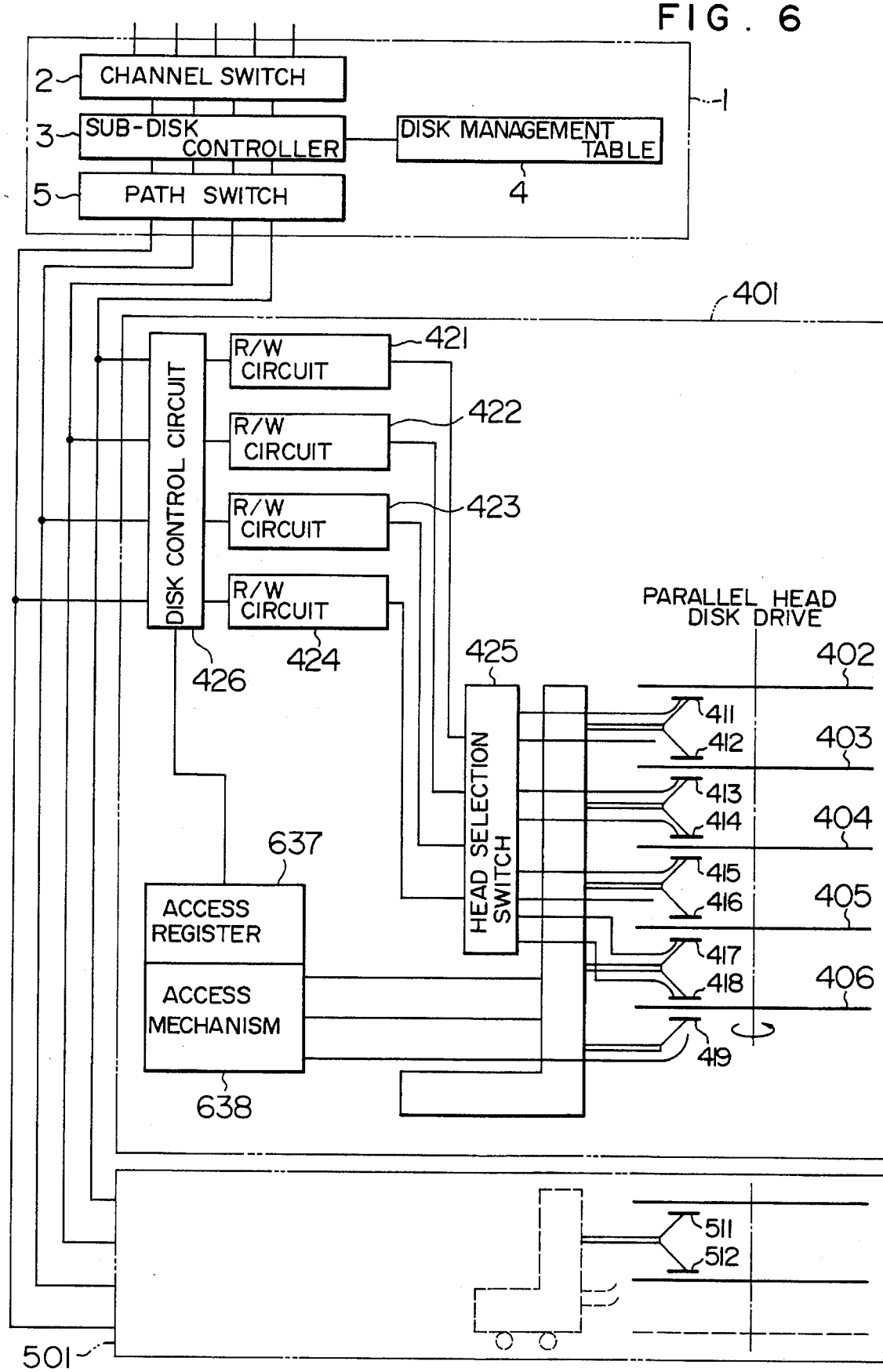
FIG. 6 is a block diagram showing another embodiment of the file system according to the present invention.

The second embodiment of this invention is shown in FIG. 6. In this embodiment, the invention is applied to a parallel head type disk driver wherein a set of plural heads is used at the same time for the data read/write. A magnetic disk drive 401 used in this embodiment have five disks 402 to 406. Eight surfaces of the disks are used as the data record surface, with eight read/write heads 411 to 418 being provided. A head 419 is a servo head for position alignment. A head selection switch 425 is provided between four read/write circuits 421 to 424 and the heads. Four paths are provided between the controller 1 and the disk drive.

The controller 1 may be of the similar structure to that shown in the first embodiment, and performs substantially the same function as the first embodiment. The disk management table 4 functions to store and supervise the number of data divisions for an allocated data set, head numbers, drive numbers, and capacity.

In allocating a data set, the number of divisions is changed with the length of data to be written, and the head group for parallel read/write is selected, which are stored in the management table 4, In writing data, by referring to the management table 4, a necessary path group is selected by the path switch 5 to thereby send a command to a disk control circuit 426 of the disk drive 401. The disk control circuit 426 has substantially the same structure as that shown in FIG. 5. A microprocessor derives access instructions from the commands sent via the plural paths, to thus position-align the heads by means of an access register 637 and access mechanism 638. Write data sent from the plural paths are stored in the buffer memories same in number as that of the paths, and sent via the same number of modulation discrimination circuits and selected read/write circuits 421 to 424, to the selected heads via the head selection switch 425 to thereby write the data. In reading data, heads are selected in the similar manner and the parallel data are read at the same time. The parallel data are converted by the sub-disk controller 3 into serial data which are sent to the computer main frame.

Some of plural heads used for simultaneous data read/write may belong to another disk drive. For example, the heads 417 and 418 and heads 511 and 512 of another disk drive 501 may be used at the same time. In such a case, commands are sent to two disk drives via different paths from the sub-disk controller 3. It is desirable to conduct synchronized revolution between disk drivers 401 and 501 in order to smoothly perform the data read/write operation.

The number of data divisions in this embodiment may be set up to the number of paths connected to each disk driver.

3rd Embodiment

The third embodiment of this invention will be described. As described previously, some computer system changes its work to be sequentially processed, and accordingly a different performance of a file system is required. For example, at commercial banks or the like, the on-line data in the day are processed in the night to obtain various statistical information. As a result, most of the files used in the day are desired to be those files for the random read/write of relatively short length data, whereas desired to be in the night are those files for the sequential read/write of relatively long length data.

If the invention is applied to such files, a remarkably efficient file system can be realized. Specifically, most of the disk drives shown in FIG. 1 for example are used as on-line files in the day, with the management table being arranged to allow independent operation of the disk drives without allowing parallel data transfer. More specifically, the disk drives 65, 75 and 85 shown in FIG. 1 are used for batch processing parallel data transfer, and the remaining disk drives are operated independently. In the night after the on-line data transfer and its processing are completed and the main processing becomes batch processing, the management table is so arranged to realize parallel data transfer type disk drives by combining together idle disk drives.

The rearrangement of the management table may be automatically carried out by user programs, or may be carried out manually by an operator who monitors the idle state of disk drives.

With the above arrangement, it is possible to use the file system both as an on-line file and a high speed batch processing file, to thereby allow an efficient system operation.

In this embodiment, one head is used for one side of a disk. A disk drive which uses plural heads for one side of a disk may also be used with the similar advantageous effects.

4th Embodiment

The fourth embodiment wherein this invention is applied to a document retrieval system, will be described. In this retrieval system, in order to speed up to retrieve a document from one hundred thousand documents in total, files storing keywords, and files storing bibliographic items such as document title, author name, publication date and the like are prepared for each field of classification. Prepared for each text are files storing character strings as code information, and files storing drawings as image data. The capacity of each file is as follows:

| Keyword file, Bibliographic Item file | 50 MB |
|---|---|
| Test file | 1 GB |
| Drawing file | 5 GB |

Figure 8:
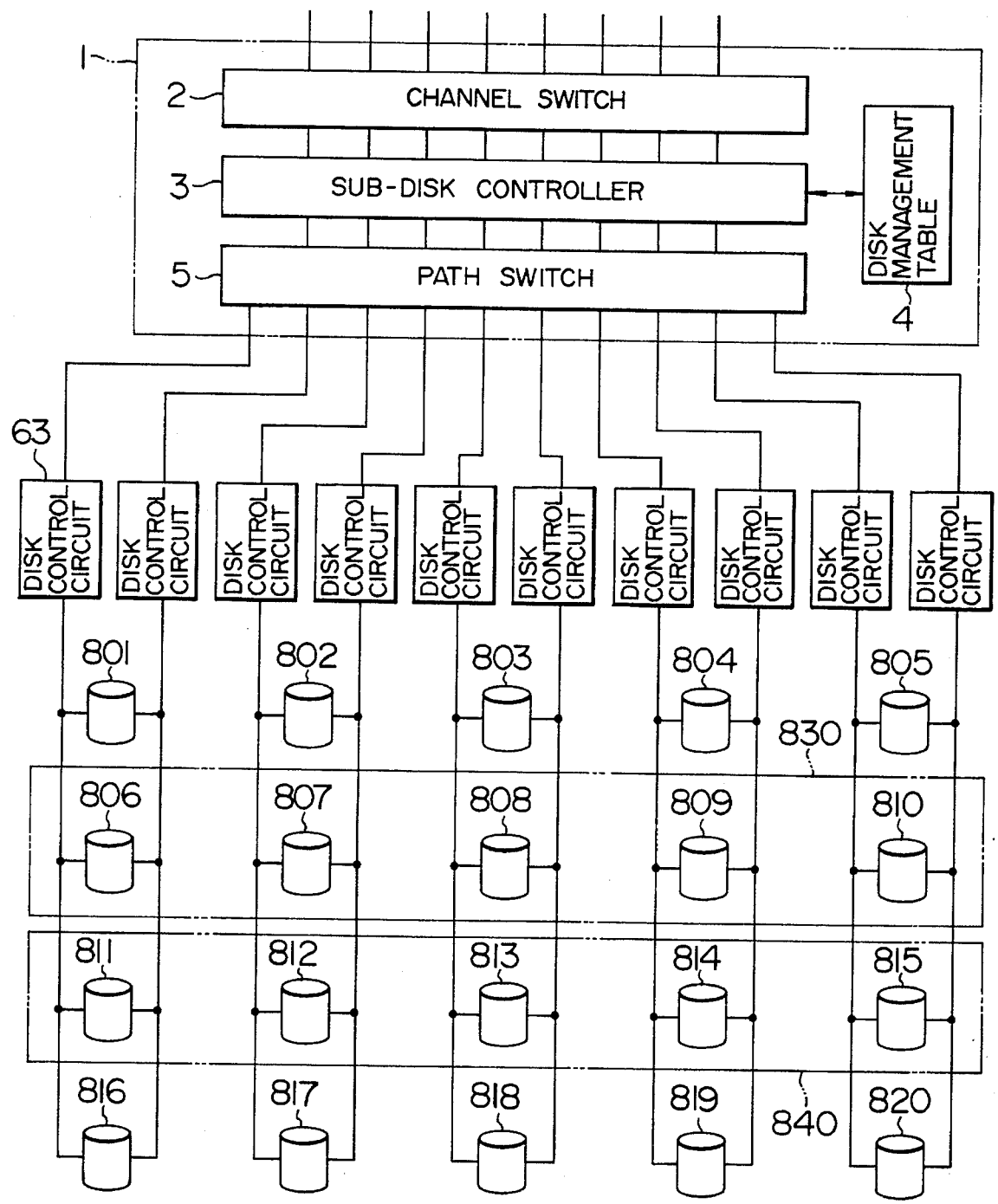
FIG. 8 is a block diagram showing a further embodiment of the file system according to the present invention.

The retrieval system uses disk drives connected as shown in FIG. 8, each disk drive having a capacity of 600 MB, transfer rate of 1.5 MB/sec, 15 trucks/cylinder, and 25 KB/truck. The files are stored in accordance with the present invention as in the following. Namely, the magnetic disk drives 801 to 805 disposed at the uppermost stage are independently operated each as one logical disk drive. The keyword files and bibliographic item files are divided by 5 for each classification (e.g., on the basis of Universal Decimal Classification) such that about 10 MB data are stored at each magnetic disk drive. Such an arrangement for storing the files divisionally allows a parallel access to the files of different classifications to thereby improve the system performance more than the case where keyword files and bibliographic item files frequently referred are stored at a single magnetic disk drive. In the remaining areas of the magnetic disk drives 801 to 805, the files storing text character strings as code information are divided by 5 for each classification are stored such that about 200 MB data are stored at each magnetic disk drive.

The files storing drawings or photographs which necessitate five times as large a capacity as character string information, per one document, are stored at ten disk drives 806 to 810 and 811 to 815 in total. According to this invention, the disk drives 806 to 810 and 811 to 815 are each used as a logical volume 830 and 840, respectively. The files are divided in unit of byte and stored at the five magnetic disk drives. In reading data, the data are read from the five magnetic disk drives at the same time. This system is further provided with spare disk drives 816 to 820 for an increase of documents.

When a user starts retrieving a certain document, a keyword or bibliographic item is keyed into access some disk drives among the disk drives 801 to 805 and list up the corresponding documents. Next, in order to see the contents of the documents, the text stored as code data is picked up from the disk drives 801 to 805. For the drawings and photographs, the logical volume 830 or 840 is accessed to actuate at the same time the five disk drives 806 to 810 or 811 to 815 constituting the logical volume. Since drawings or photographs per one document have a capacity five times as large as the text, it takes five times as long as that of the text read time if the drawings or photographs are stored at one disk drive as conventional, thus making long the following processing time at each terminal. By using this invention, it is possible to transfer to a user terminal (not shown) the text and the drawings or photographs both substantially by the same period. As a result, the data can be displayed quickly on the terminal, by a period one fifth of the conventional period. The disk management table in this embodiment is arranged as shown in FIG. 9.

If a file is added to this system and the file does not include photographs or drawings, it is stored at the disk drives 816 to 820 each independently used as a logical volume. If the file includes photographs or drawings, the magnetic disk drives 816 to 820 are used as a whole as one logical volume, and the text thereof is stored at other disk drives. As appreciated from the foregoing description, according to this invention, the arrangement of the file system may be changed as desired with the user data characteristics.

In this embodiment, keyword and bibliographic item files are divided for each classification and stored at respective disk drives. It is possible otherwise to store the file not divided at all the disk drives 801 to 805.

5th Embodiment

The fifth embodiment of this invention will be described with reference to FIG. 10. The computer system of this embodiment is constructed of a processing unit 902, controller 1, plural disk drives 6, and input/output device 917. The input/output device 917 may be connected with other external storage units such as magnetic tapes and the like. The processing unit 902 is constructed of a central processing unit 903, main storage unit 904, input/output control units 908 and 908', and path control unit 907. The controller 1 is constructed of a pair of interface control units 9 and 10 for controlling the interfaces on the channel side and device side, cache memory 12, nonvolatile memories 13 and 14, and path control unit 11. The disk drive 6 is constructed of a plurality of head/disk assemblies.

The record (write) operation between the processing unit 902 and the disk drive 6 will be described. The transfer rate of data from the main storage unit 908 between the input/output processing control unit 908 and controller 1 is determined by the central processing unit 903 in accordance with the transfer data amount. In an ordinary computer system, the transfer rates between the input/output control unit and controller, and between the controller and disk drives are usually the same, so that the transfer rate can be made faster by using a higher order multiplexing at the interfaces. In this embodiment, an example of a four-fold multiplexing of the interfaces is given. Data a to d in the main storage unit 904 to be transferred to the disk drive 6 are divided by 4 at the path control unit 907 and parallel sent to the input/output control unit 908 which is constructed of as many input/output circuits 17 as the maximum multi-fold multiplexing number capable of being designated. In this embodiment, because of the four-fold multiplexing, the data are transferred to the controller 1 by means of the four input/output control circuits 17 selected by the path control unit 907 via the four interfaces between the processing unit and controller. Via the four interface control circuits 18 in the interface control unit 9 corresponding to the input/output control circuits 17 of the processing unit 902 selectively used by the controller 1, the data are transferred to the cache memory 12 and nonvolatile memory 13, respectively at areas a' to d' and a" to d" corresponding to a to d in the main storage unit. The address control for the data transferred from the processing unit 902 to the memories, and the selection of interface control circuits 902 are conducted by the path control unit 11 in accordance with a multi-fold multiplexing order instruction from the processing unit 902. Upon completion of data transfer to the cache memory 12 and nonvolatile memory 13, the interfaces between the processing unit and controller are disconnected.

The data transfer from the controller 1 to the disk drive 6 is as in the following. Under control of the path control unit 11 and by means of the four interface control circuits 19 in the interface control unit 10, the data in the cache memory 12 at a' to d' are parallel transferred to and stored in the corresponding disk drive 6. The disk drive 6 is constructed of four Head/Disk Assemblies (HDAs) each HDA having four actuators, read/write systems by way of example. In FIG. 10, interfaces 16 to the HDAs of other disk drives 6 are omitted.

After the data transfer to the cache memory 12, the nonvolatile memory 13 is used for storing a part of the data and control information to be stored at the disk drive, in order to prevent the data from being lost due to a power failure or the like. The operation of the nonvolatile memory 14 will be described later. The interfaces between the controller and disk drives is preferably provided as many as the number of all the actuators included in the connectable disk drives 6. It is necessary for each disk drive to provide at least the interfaces as many as the number larger than the multi-fold multiplexing number capable of being designated.

Next, the read operation will be described. Similar to the write operation, the multi-fold multiplexing order at the interfaces is controlled in accordance with the transfer data amount also in the read operation. In the case of the four-fold multiplexing for example, the data are read from the designated disk drives 6 by means of four actuators and sent via the interfaces 16 between the disk drives and controller and via the four interface control circuits 19 to the cache memory 12, and stored therein at the areas designated by the path control unit 11. Then, the disk drives are disconnected.

The data stored in the cache memory 12 are read therefrom, and transferred to the main storage unit at the predetermined areas via the four interface circuits 18 on the multi-fold multiplexing designated channels side, interfaces 15 between the processing unit and controller, and path control circuits 17.

It is preferable that a plurality of head/disk assemblies of a disk drive at which divided data are stored, revolved synchronously with each other. If there is not provided a means for conducting a synchronized rotation, data transfer rate at the controller will vary. This fluctuation of data transfer time is at a maximum within a latency time corresponding to one revolution. A sink-down of data because of a busy state of the processing unit rarely occurs if there is an idle path to the cache memory.

Another operation associated with this embodiment will be described. In the above-described operation, the nonvolatile memory 13 is used, whereas in this operation, the second nonvolatile memory 14 is used. In this operation, data read/write is carried out relative to particular trucks on the disk drive 6 by using the nonvolatile memory 14. Specifically, upon turning the system 902 power on, the data on the designated trucks are transferred to the nonvolatile memory 14. In a data read/write operation, the data in the nonvolatile memory 14 are regarded as the data present at the disk drive. Upon turning the system 902 power off, the data in the nonvolatile memory 14 are transferred to and written in the designated trucks on the disk drive.

As described above, the data read/write rate for the data in the nonvolatile memory 14 corresponding to the particular trucks is improved in the order of hundred- to thousand-fold because of absence of access time and latency time. The disk drive and trucks for the data transferred to the nonvolatile memory are designated by the path control unit 11. There are two truck designation modes. One is a fixed mode wherein the trucks for frequently accessed data such as directory are fixedly designated. The other is a variable mode wherein the trucks frequently accessed are designated. The variable mode is provided in order to retain a high throughput even if the trucks frequently accessed change with time during on-line operation. An intermediate mode satisfying the two modes may sometimes be used.

As the variable mode for truck designation, a Least Recently Used (LRU) method may be used in ordinary cases. In this case, data are not transferred to the nonvolatile memory at every data read/write operation, but the data which have been read or written more than or equal to a predetermined number per unit time, are transferred to the nonvolatile memory. When trucks are designated, the data are transferred from the disk drive 6 to the nonvolatile memory 14. On the other hand, when truck designation is released, the data are transferred from the nonvolatile memory 14 to the disk drive 6. Use of the nonvolatile memory for the data storage at particular trucks allows to store the recent data at the particular trucks of the disk drive after recovery of power failure as described above. Instead of the nonvolatile memory, a semiconductor with back-up batteries may be used.

6th Embodiment

The sixth embodiment will be described. In this embodiment, there is not provided at the controller 1 a nonvolatile memory for data read/write at particular trucks, but provided nonvolatile memories 920 near at the head/disk assemblies of the disk drive 6. FIG. 11 shows one head/disk assembly 921 in the disk drive 6 and the peripheral circuit arrangement. In this embodiment, there are provided two nonvolatile memories 920 corresponding to two access mechanisms in the head/disk assembly 921. The data at particular trucks only are accessed by each access mechanism for data read/write. Transfer of data at particular trucks on disks to the nonvolatile memory, and designation of particular trucks are carried out in the similar manner as described with the embodiment shown in FIG. 10.

Figure 10:
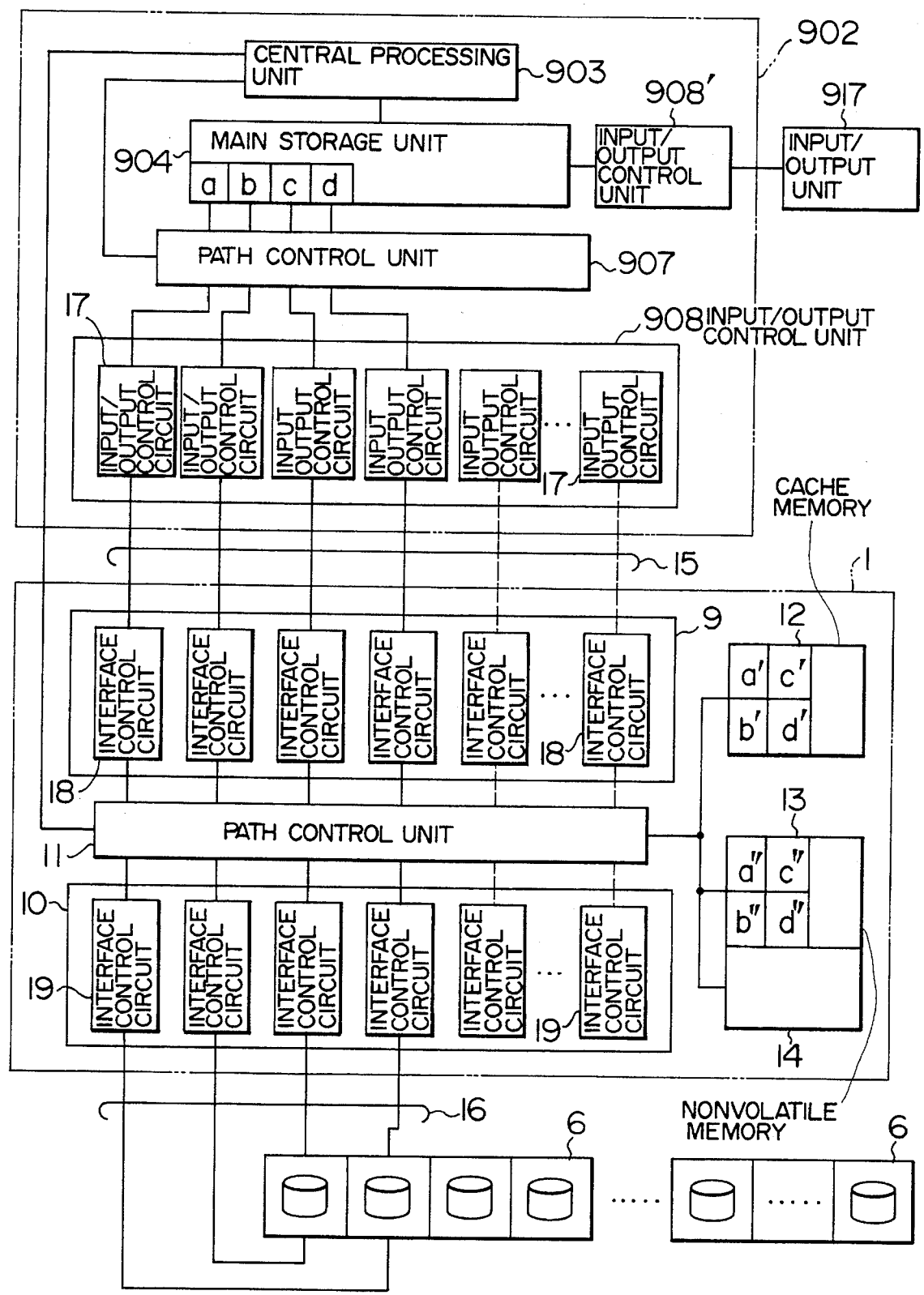
FIG. 10 shows the system configuration according to an embodiment of this invention.
Figure 11:
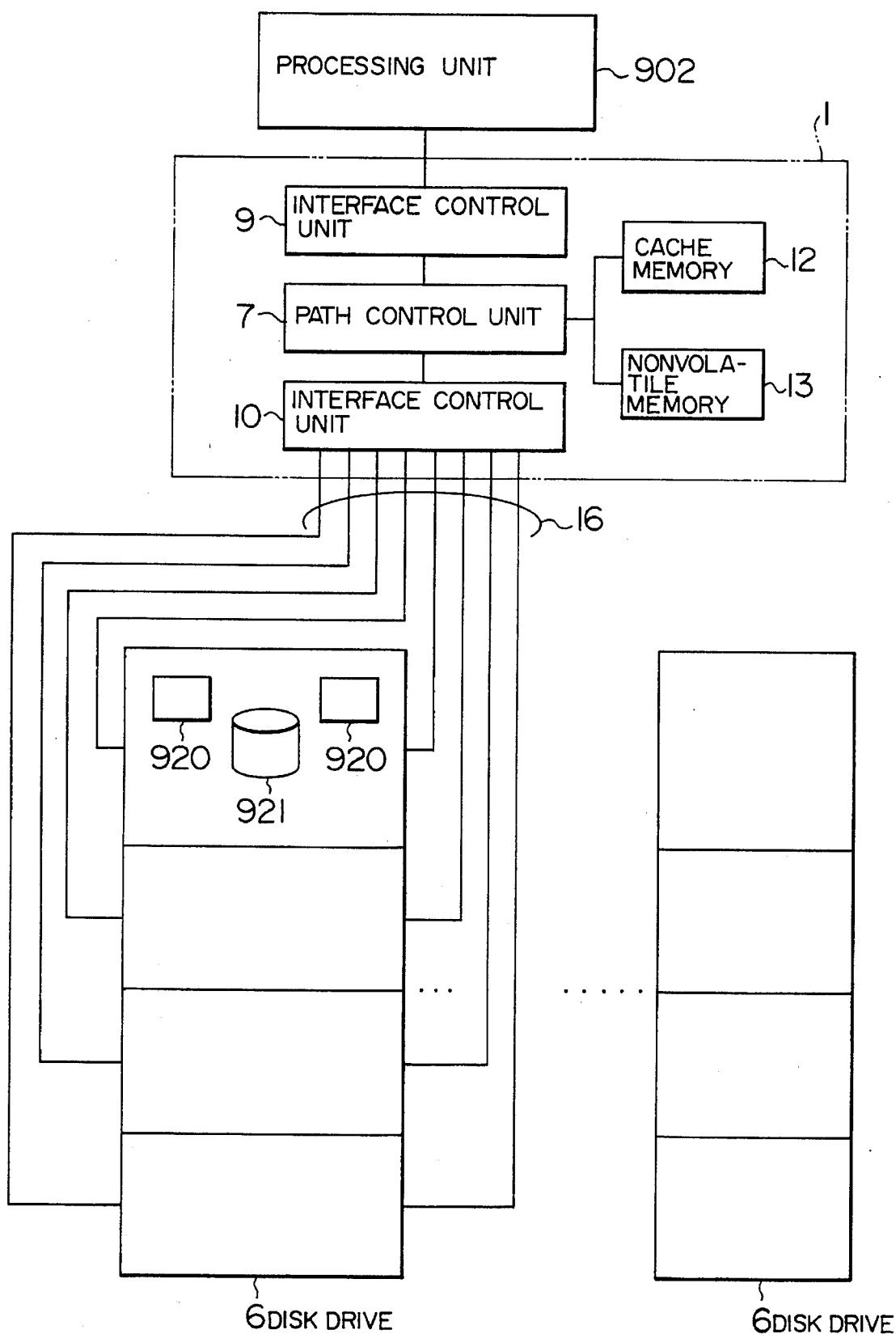
FIG. 11 shows the system configuration according to another embodiment of this invention.
Figure 12:
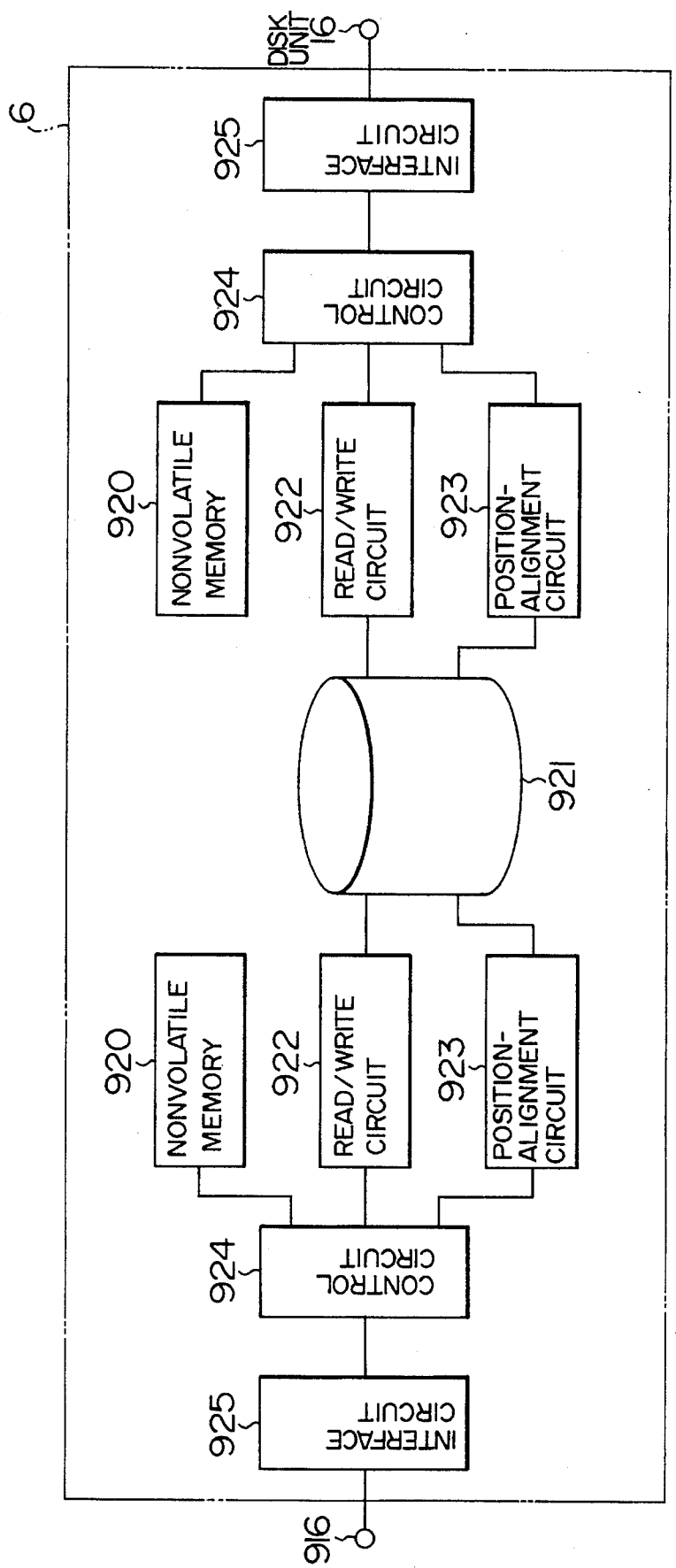
FIG. 12 shows the detailed structure of another embodiment of the disk drive according to the present invention.

In the embodiment shown in FIG. 10, the nonvolatile memory 14 is used in common and can have a large capacity so that even if data to be transferred to the nonvolatile memory are concentrated to a particular disk drive 6, the data transfer can be performed flexibly. In the embodiment shown in FIG. 11, the data in the nonvolatile memories 920 corresponding at particular trucks are in one-to-one correspondence with the access mechanisms, so that it is easy to judge if the data to be written or read are on the nonvolatile memory or not, thus improving the overhead.

In the case where the cache memory and nonvolatile memories are both used as in the above-described embodiment, the data in the nonvolatile memory are also in the cache memory without failure. It is therefore desirable to first check if data are present on the nonvolatile memory, and if not present, then the data on the cache memory are used for read/write operation.

In the disk drive shown in the fifth and sixth embodiments, an access mechanism is provided with a set of read and write circuits, namely, only one head is selectable by an access mechanism. For this reason, heads are parallel selected by using a plurality of access mechanisms. For a disk drive system wherein an access mechanism can parallel select a plurality of heads, a single access mechanism may be selected to perform a parallel read/write operation.

Also in the above two embodiments, a plurality of interfaces between the processing unit and controller are parallel selected for data transfer. For the interfaces of a high-speed time sharing system, instead of the multi-fold multiplexing, the number of time slots may be increased to make faster the data transfer rate.

In the above two embodiments, it is assumed that the transfer rates between the processing unit and controller, and between disk drives and interfaces, are the same. However, the transfer rates are not necessarily required to be the same because the data are temporarily stored in the memory provided at the controller.

The disk drive of the embodiments may use magnetic disk drives, optical disk drives, or magnetooptical disk drives.

The nonvolatile memory of the embodiments may use semiconductor nonvolatile memories, semiconductor memories with back-up batteries, or the like.

As appreciated from the foregoing description of the present invention, the file system can be used divisionally as desired depending upon the user requirements or the data characteristics, thereby allowing a file system flexible to the user requirements. This system is also applicable to a file whole characteristic changes with time.

Further, it is possible to realize a file system capable of efficient data read/write without changing system hardwares, irrespective of data length and different transfer rates requested by a user.

According to the present invention, the data transfer rate at the interfaces among the processing unit, controller and disk drives can be set in accordance with the transfer data amount, by changing the multi-fold multiplexing order or parallel processing degree. Therefore, the transfer data rate can be made fast irrespective of the transfer data amount.

Further, a cache memory and nonvolatile memory are provided at the controller so as to perform a data transfer between the processing unit and disk drives by using the memories. Upon completion of data transfer to the memories, the upper or lower hierarchic devices are disconnected so that the time occupied by the disconnected devices is reduced to allow an effective use of the devices. In addition, it is possible to avoid a sink-down of data to be caused by miss-reconect due to busy upper hierarchic devices during a read operation.

Further, a nonvolatile memory is provided at the controller or at the disk drives to store therein specific data frequently accessed. The read/write operation for such data is performed by using the volatile memory, to thereby considerably (in the order of hundred- to thousand-fold) reduce the read/write time required by the disk drives and considerably improve the throughput of the computer system.

We claim:

1. In a disc array system which includes a plurality of disc storage devices and a disc array controller connected to an upper device by at least one upper path and to said plurality of disc storage devices by a plurality of lower paths, a method for controlling accesses to the plurality of disc storage devices comprising the steps, executed by the disc array controller, of:

dividing data of first kind given by the upper device through the one upper path into plural portions, the data of first kind being data for which the upper device has designated a division number which is larger than one;

not dividing data of second kind given by the upper device through the one upper path, the data of the second kind being data for which the upper device has not designated a division number which is larger than one;

writing said plural portions of said data of first kind in parallel into a plurality of regions belonging to plural ones of said disc storage device by plural ones of said plurality of lower paths; and writing said data of second kind into one region belonging to one of the plurality of disc storage devices by one of the plurality of lower paths.

2. In a disc array system which includes a plurality of disc storage devices and a disc array controller connected to an upper device by at least one upper path and to said plurality of disc storage devices by a plurality of lower paths, a method for controlling accesses to the plurality of disc storage devices comprising steps executed by the disc array controller, of:

receiving a region assignment request given by the upper device for a data set through the one upper path, said request designating a length of data belonging to said data set, said data set being one which will be given by said upper device so as to be written into said plurality of disc storage devices;

assigning to the data set, either a region belonging to one of the plurality of disc storage devices when said data set is shorter than the designated length of data, or a plurality of regions belonging to different ones of said plurality of disc storage devices when said data set is longer than the designated length of data;

writing data belonging to the data set as subsequently given by the upper device by way of the one upper path into the one region assigned to the data set, when the one region has been assigned to the data set in the assigning step, the subsequently given data being transferred to the one region by way of one of the plurality of lower paths; and writing plural data portions of the subsequently given data in parallel into the plurality of regions assigned to the data set, when the plurality of regions have been assigned to the data set in the assigning step, the plural portions of the subsequently given data being transferred to said plurality of regions by way of plural ones of the plurality of lower paths.

3. A method according to claim 2, wherein the assigning step includes a step of selecting one of a plurality of division numbers each larger than one, as a total number of a plurality of regions to be assigned to the data set, so that the larger the designated length of data is, the larger the selected division number is, when a plurality of regions are to be assigned to the data set.

4. A method according to claim 3, wherein the selecting step includes a step of determining a division number to be selected to be a predetermined division number which is larger than 1 when the length of the data is longer than the designated length of data and a second designated length of data.

5. In a disc array system which includes a plurality of disc storage devices and a disc array controller connected to an upper device by at least one upper path and to said plurality of disc storage devices by a plurality of lower paths, a method for controlling accesses to the plurality of disc storage devices comprising steps executed by the disc array controller of:

receiving a region assignment request given by the upper device for a data set through the one upper path, said request designating a data transfer rate by which data belonging to the data set is to be transferred;

assigning to the data set, either a region belonging to one of the plurality of disc storage devices when said data set requires a data transfer rate lower than the designated data transfer rate, or a plurality of regions belonging to different ones of said plurality of disc storage devices when said data set requires a data transfer rate higher than the designated data transfer rate;

writing data belonging to the data set as subsequently given by the upper device by way of the one upper path, into the one region assigned to the data set, when the one region has been assigned to the data set in the assigning step, the subsequently given data being transferred to the one region by one of the plurality of lower paths; and writing plural data portions of the subsequently given data in parallel into the plurality of regions assigned to the data set, when the plurality of regions have been assigned to the data set in the assigning step, the plural portions of the subsequently given data being transferred to said plurality of regions by way of plural ones of the plurality of lower paths.

6. A method according to claim 5, wherein the designated data transfer rate is a transfer rate during recording or reproducing by a head.

7. In a disc array system which includes a plurality of disc storage devices and a disc array controller connected to an upper device by at least one upper path and to said plurality of disc storage devices by a plurality of lower paths, a method for controlling accesses to the plurality of disc storage devices comprising steps, executed by the disc array controller, of:

assigning either one region belonging to one of the plurality of disc storage devices when data given by the upper device through the one upper path is shorter than a predetermined length of the data or a plurality of regions belonging to different ones of the plurality of disc storage devices when the data given by the upper device through the one upper path is longer than the predetermined length of the data;

writing the data into the one region by way of one of the plurality of lower paths, when the one region has been assigned to the data by the assigning step; and writing plural portions of the data in parallel into the plurality of regions by way of plural ones of said plurality of lower paths, when the plurality of regions have been assigned to the data by the assigning step.

8. A method according to claim 7, wherein the assigning step increases a total number of the plurality of regions assigned to the data, when the length of the data is further longer.

9. A method according to claim 8, wherein the assigning step includes a step of determining a division number to be selected to be a predetermined division number which is larger than 1 when the length of the data is longer than the designated length of data and a second designated length of data.

10. In a disc array system which includes a plurality of disc storage devices and a disc array controller connected to an upper device by at least one upper path and to said plurality of disc storage devices by a plurality of lower paths, a method for controlling accesses to the plurality of disc storage devices comprising steps, executed by the array controller, of:

assigning either one region belonging to one of the plurality of disc storage devices when data given by the upper device through the one upper path requires a data transfer rate lower than a predetermined data transfer rate or a plurality of regions belonging to different ones of the plurality of disc storage devices when the data given by the upper device through the one upper path requires a data transfer rate higher than the predetermined data transfer rate;

writing said data into said one region by way of one of the plurality of lower paths, when said one region has been assigned to said data by the assigning step; and writing plural portions of said data in parallel into said plurality of regions by plural ones of said plurality of lower paths, when said plurality of regions have been assigned to said data by the assigning step.

11. A method according to claim 10, wherein the predetermined data transfer rate is a transfer rate during recording or reproducing by a head.

12. In a disc array system which includes a plurality of disc storage devices and a disc array controller connected to an upper device by at least one upper path and to said plurality of disc storage devices by a plurality of lower paths, a method for controlling accesses to the plurality of disc storage devices comprising steps, executed by the disc array controller, of:

dividing data into plural portions when the length of the data given by the upper device through the one upper path is larger than a predetermined value;

not dividing data when the length of the data given by the upper device through the upper path is smaller than the predetermined value;

writing said plural portions of said data in parallel into a plurality of regions belonging to plural ones of said disc storage devices by plural ones of said plurality of lower paths; and writing said data into one region belonging to one of the plurality of disc storage devices by one of the plurality of lower paths.

13. A method according to claim 12, further comprising the steps of:

dividing data, larger than another predetermined value which is larger than said predetermined value, given by the upper device through the one upper path into a larger number of plural portions than a total number of the plural portions of said data; and writing said larger number of plural portions of said data in parallel into a larger plurality of regions belonging to more parallel ones of said plurality of disc devices by more plural ones of said plurality of lower paths.

14. In a disc array system which includes a plurality of disc storage devices and a disc array controller connected to an upper device by at least one upper path and to said plurality of disc storage devices by a plurality of lower paths, a method of controlling accesses to the plurality of disc storage devices comprising steps, executed by the disc array controller, of:

dividing data of first kind given by the upper device through the one upper path into plural portions, the data of first kind being data for which the upper device has requested a data transfer rate higher than a predetermined data transfer rate;

not dividing data of second kind given by the upper device through the one upper path, the data of second kind being data for which the upper device has requested a data transfer rate lower than the predetermined data transfer rate;

writing said plural portions of said data of first kind in parallel into a plurality of regions belonging to plural ones of said disc storage devices by plural ones of said plurality of lower paths; and writing said data of second kind into one region belonging to one of the plurality of disc storage devices by one of the plurality of lower paths.

15. A method according to claim 14, wherein the predetermined data transfer rate is a data transfer rate during recording or reproducing by a head.

16. A disc array system, comprising:

a plurality of disc storage devices; and a disc array controller connected to an upper device by at least one upper path and to said plurality of disc storage devices by a plurality of lower paths;

the disc array controller comprises:

means for dividing data of first kind given by the upper device through the one upper path into plural portions, the data of first kind being data for which the upper device has designated a division number which is larger than one, means for not dividing data of a second kind given by the upper device through the one upper path, the data of the second kind being data for which the upper device has not designated a division number which is larger than one, means for writing said plural portions of said data of first kind in parallel into a plurality of regions belonging to plural ones of said disc storage devices by plural ones of said plurality of lower paths, and means for writing said data of second kind into one region belonging to one of the plurality of disc storage devices by one of the plurality of lower paths.

17. A disc array system, comprising:

a plurality of disc storage devices, and a disc array controller connected to an upper device by at least one upper path and to said plurality of disc storage devices by a plurality of lower paths, the disc array controller comprising:

means for receiving a region assignment request given by the upper device for a data set through the one upper path, said request designating a length of data belonging to said data set, said data set being one which will be given by said upper device so as to be written into said plurality of disc storage devices, means for assigning to the data set, either a region belonging to one of the plurality of disc storage devices when said data set is shorter than the designated length of data, or a plurality of regions belonging to different ones of said plurality of disc storage devices when said data set is longer than the designated length of data, means for writing data belonging to the data set as subsequently given by the upper device by the one upper path, into the one region assigned to the data set, when the one region has been assigned to the data set by the assigning means, the subsequently given data being transferred to the one region by one of the plurality of lower paths, and means for writing plural data portions of the subsequently given data in parallel into the plurality of regions assigned to the data set, when the plurality of regions have been assigned to the data set by the assigning means, the plural portions of the subsequently given data being transferred to said plurality of regions by way of plural ones of the plurality of lower paths.

18. A disc array system according to claim 17, wherein the assigning means includes means for selecting one of a plurality of division numbers each larger than one, as a total number of a plurality of regions to be assigned to the data set, so that the larger the designated length of data is, the larger the selected division number is, when a plurality of regions are to be assigned to the data set.

19. A disc array system according to claim 18, wherein the selecting means includes means for determining a division number to be selected to be a predetermined division number which is larger than 1 when the length of the data is longer than the designated length of data and a second designated length of data.

20. A disc array system, comprising:

a plurality of disc storage devices; and a disc array controller connected to an upper device by at least one upper path and to said plurality of disc storage devices by a plurality of lower paths;

the disc array controller comprises:

means for receiving a region assignment request given by the upper device for a data set through the one upper path, said request designating a data transfer rate by which data belonging to the data set is to be transferred, means for assigning to the data set, either a region belonging to one of the plurality of disc devices when said data set requires a data transfer rate lower than the designated data transfer rate or a plurality of regions belonging to different ones of said plurality of disc storage devices when said data set requires a data transfer rate higher than the designated data transfer rate, means for writing data belonging to the data set as subsequently given by the upper device by way of the one upper path, into the one region assigned to the data set, when the one region has been assigned to the data set by the assigning means, the subsequently given data being transferred to the one region by way of one of the plurality of lower paths, and means for writing plural data portions of the subsequently given data in parallel into the plurality of regions assigned to the data set, when the plurality of regions have been assigned to the data set by the assigning means, the plural portions of the subsequently given data being transferred to said plurality of regions by plural ones of the plurality of lower paths.

21. A disc array system according to claim 20, wherein the designated data transfer rate is a transfer rate during recording or reproducing by a head.

22. A disc array system, comprising:

a plurality of disc storage devices, and a disc array controller connected to an upper device by means of at least one upper path and to said plurality of disc storage devices by a plurality of lower paths;

the disc array controller comprises:

means for assigning either one region belonging to one of the plurality of disc storage devices when data given by the upper device through the one upper path is shorter than a predetermined length of the data or a plurality of regions belonging to different ones of the plurality of disc storage devices when the data given by the upper device through the one upper path is longer than the predetermined length of the data, means for writing the data into the one region by way of one of the plurality of lower paths, when the one region has been assigned to the data by the assigning means, and means for writing plural portions of the data in parallel into the plurality of regions by way of plural ones of said plurality of lower paths, when the plurality of regions have been assigned to the data by the assigning means.

23. A disc array system according to claim 22, wherein the assigning means increases a total number of the plurality of regions assigned to the data, when the length of the data is further longer.

24. A disc array system according to claim 23, wherein the assigning means includes means for determining a division number to be selected to be a predetermined division number which is larger than 1 when the length of the data is longer than the designated length of data and a second designated length of data.

25. A disc array system, comprising:

a plurality of disc storage devices; and a disc array controller connected to an upper device by at least one upper path and to said plurality of disc storage devices by a plurality of lower paths;

the disc array controller comprises:

means for assigning either one region belonging to one of the plurality of disc storage devices when data given by the upper device through the one upper path requires a data transfer rate lower than a predetermined data transfer rate or a plurality of regions belonging to different ones of the plurality of disc storage devices when the data given by the upper device through the one upper path requires a data transfer rate higher than the predetermined data transfer rate, means for writing said data into said one region by one of the plurality of lower paths, when said one region has been assigned to said data by the assigning means, and means for writing plural portions of said data in parallel into said plurality of regions by plural ones of said plurality of lower paths, when said plurality of regions have been assigned to said data by the assigning means.

26. A disc array system according to claim 25, wherein the predetermined data transfer rate is a transfer rate during recording or reproducing by a head.

27. A disc array system comprises:

a plurality of disc storage devices; and a disc array controller connected to an upper device by at least one upper path and to said plurality of disc storage devices by a plurality of lower paths;

the disc array controller comprises:

means for dividing data when the length of the data given by the upper device through the one upper path is larger than a predetermined value, means for not dividing data when the length of the data given by the upper device through the upper path is smaller than the predetermined value, means for writing said plural portions of said data in parallel into a plurality of regions belonging to plural ones of said disc storage devices by plural ones of said plurality of lower paths; and means for writing said data into one region belonging to one of the plurality of disc storage devices by one of the plurality of lower paths.

28. A disc array system according to claim 27, further comprising:

means for dividing data larger than another predetermined value which is larger than said predetermined values given by the upper device through the one upper path into a more number of plural portions than a total number of the plural portions of said data; and means for writing said larger number of plural portions of said data in parallel into a more plurality of regions belonging to more plural ones of said plurality of disc devices by way of more plural ones of said plurality lower paths.

29. A disc array system, comprising:

a plurality of disc storage devices; and a disc array controller connected to an upper device by at least one upper path and to said plurality of disc storage devices by means of a plurality of lower paths;

the disc array controller comprises:

means for dividing data of a first kind given by the upper device through the one upper path into plural portions, the data of first kind being data for which the upper device has requested a data transfer rate higher than a predetermined data transfer rate, means for not dividing data of second kind given by the upper device through the one upper path, the data of second kind being data for which the upper device has requested a data transfer rate lower than the predetermined data transfer rate, means for writing said plural portions of said data of first kind in parallel into a plurality of regions belonging to plural ones of said disc storage devices by plural ones of said plurality of lower paths, and means for writing said data of second kind into one region belonging to one of the plurality of disc storage devices by one of the plurality of lower paths.

30. A disc array system according to claim 29, wherein the predetermined data transfer rate is a data transfer rate during recording or reproducing by a head.

* * * * *